(12) United States Patent
Myers et al.

(10) Patent No.: US 9,351,571 B2
(45) Date of Patent: May 31, 2016

(54) CONNECTION ASSEMBLY FOR A BASE AND A CABINET ASSEMBLY OF AN ICE MAKER

(71) Applicant: Manitowoc Foodservice Companies, LLC., Manitowoc, WI (US)

(72) Inventors: John P. Myers, Manitowoc, WI (US); Curt R. Cayemberg, Manitowoc, WI (US); Dean M. Petersen, Manitowoc, WI (US); Mark P. Giebel, Manitowoc, WI (US)

(73) Assignee: Manitowoc Foodservice Companies, LLC, Manitowoc, WI (US)

( * ) Notice: Subject to any disclaimer, the term of this patent is extended or adjusted under 35 U.S.C. 154(b) by 0 days.

(21) Appl. No.: 13/932,369

(22) Filed: Jul. 1, 2013

(65) Prior Publication Data

US 2014/0015393 A1    Jan. 16, 2014

Related U.S. Application Data

(60) Provisional application No. 61/670,237, filed on Jul. 11, 2012.

(51) Int. Cl.
*F25C 5/18* (2006.01)
*A47B 91/00* (2006.01)
*G06F 13/40* (2006.01)

(52) U.S. Cl.
CPC .......... *A47B 91/005* (2013.01); *G06F 13/4027* (2013.01)

(58) Field of Classification Search
USPC ......... 312/107, 108, 400, 401, 271, 273, 308, 312/321, 330.1, 349, 350, 351.1
See application file for complete search history.

(56) References Cited

U.S. PATENT DOCUMENTS

| | | | | |
|---|---|---|---|---|
| 188,566 | A | * 3/1877 | Barnes | .......................... 312/201 |
| 2,392,727 | A | 1/1946 | Dailey | |
| 3,111,720 | A | * 11/1963 | Sherron | ............................ 52/28 |
| 3,201,187 | A | * 8/1965 | Hahn et al. | ............... 312/334.34 |
| 3,219,400 | A | * 11/1965 | Bergquist | ...................... 312/107 |

(Continued)

FOREIGN PATENT DOCUMENTS

| | | | |
|---|---|---|---|
| JP | 50110471 U | 9/1975 | |
| JP | S50110471 U | 9/1975 | |

(Continued)

OTHER PUBLICATIONS

Extended European Search Report dated Jul. 17, 2014 for European application No. 13175121.6.

(Continued)

*Primary Examiner* — Daniel Rohrhoff
(74) *Attorney, Agent, or Firm* — Ohlandt, Greeley, Ruggiero & Perle, LLP

(57) ABSTRACT

A connection assembly is disclosed for an ice maker that includes a base having a rail and a cabinet assembly having a glide. The glide slides onto the rail to removably connect the base and the cabinet assembly while aligning the cabinet assembly vertically and horizontally relative to the base. Preferably, the rail and glide have complementary geometries wherein the base and rail fit together such that the complementary geometries limit the relative vertical and horizontal movement of the rail and the glide to each other. In alternative configurations, the base may have a glide and the cabinet may have a rail. The connection assembly may also include a stop limiting the relative linear movement between the rail and the glide, further assuring proper alignment of the cabinet and the base. The connection assembly may also include a locking mechanism limiting relative linear movement of the base and the cabinet.

9 Claims, 9 Drawing Sheets

(56) References Cited

U.S. PATENT DOCUMENTS

| | | | | |
|---|---|---|---|---|
| 3,365,261 | A | * | 1/1968 | Gutner .................. A47B 88/12 312/330.1 |
| 4,706,466 | A | * | 11/1987 | Yingst et al. .................... 62/138 |
| 4,996,628 | A | * | 2/1991 | Harvey et al. ................. 361/735 |
| 5,245,841 | A | | 9/1993 | Paul et al. |
| 5,245,891 | A | * | 9/1993 | Marich et al. ............... 74/606 R |
| 5,361,602 | A | | 11/1994 | Furukawa et al. |
| 6,233,964 | B1 | | 5/2001 | Ethington et al. |
| 7,896,450 | B2 | * | 3/2011 | Yamazaki et al. ............ 312/114 |
| 2012/0306338 | A1 | | 12/2012 | Nagahata et al. |

FOREIGN PATENT DOCUMENTS

| | | |
|---|---|---|
| JP | 2009052791 | 3/2009 |
| TW | 201200828 A | 1/2012 |

OTHER PUBLICATIONS

Chinese Office Action dated Apr. 20, 2015 for Chinese application No. 201310291072.1.

Mexican Office Action dated May 28, 2015 for Mexican application No. MX/a/2013/007916.

Office Action dated Nov. 26, 2015 for corresponding Mexico patent application No. MX/a/20131007916 with English translation, pp. 9.

Canadian Patent Office action dated Dec. 7, 2015 from corresponding Canadian Patent Application No. 2,820,154, pp. 4.

Office Action dated Dec. 7, 2015 for corresponding Taiwanese patent application No. 102124505 with English Summary, pp. 8.

Office Action dated Dec. 10, 2015 for corresponding Chinese patent application No. 201310291072.1 pp. 8.

\* cited by examiner

CONNECTION ASSEMBLY FOR A BASE AND A CABINET ASSEMBLY OF AN ICE MAKER

CROSS-REFERENCED APPLICATION

This application claims priority to U.S. Provisional Application Ser. No. 61/670,327, filed on Jul. 11, 2012, which is incorporated herein in its entirety by reference thereto.

BACKGROUND OF THE DISCLOSURE

1. Field of the Disclosure

The present disclosure relates to a connection assembly for assembling a base and a cabinet assembly of an ice maker. The present disclosure further relates to a connection assembly for assembling an ice maker and bin assembly with easily removable components that allows direct access to serviceable components. The present disclosure also provides for modular assembly of a cabinet assembly which improves manufacturing flexibility. The present disclosure additionally relates to a connection assembly for assembling a base and a cabinet assembly of an ice maker that provides for proper vertical and horizontal alignment of the base and cabinet.

2. Description of Related Art

Ice makers typically have a refrigeration system and a water distribution system that distributes water onto an ice forming surface that is connected to the refrigeration system forming ice. The refrigeration system performs a vapor compression cycle as is known in the art for cooling during an ice forming cycle and heating during an ice harvesting cycle to release ice from the ice forming surface and for storing the ice in an ice bin. The refrigeration system, ice bin and water distribution system are in a housing that is typically insulated.

The housings of ice makers presently do not have removable components that allow for easy accessibility for service and maintenance of the refrigeration system, ice bin, and the water distribution system. Even further, the removable components of the housings may become misaligned when reassembled after completion of service and maintenance. The components of conventional ice makers are also of a fixed configuration that does not permit flexibility in manufacturing.

Therefore, it has been determined by the present disclosure that there is a need for a connection assembly for assembling a base and a cabinet assembly of an ice maker that allows direct access to serviceable components, provides for proper alignment of the base and cabinet assembly, and provides for modular assembly of the cabinet assembly and base that improves manufacturing flexibility.

SUMMARY

The present disclosure provides a connection assembly for an ice maker that includes a base having a rail and a cabinet assembly having a glide. The glide slides onto the rail to allow for connection and removal of the base and the cabinet assembly, aligning the cabinet assembly vertically and horizontally relative to the base.

The present disclosure provides a connection assembly for an ice maker that includes, in one embodiment, a rail for a base, the rail having a geometry and a glide for a cabinet, the glide having a geometry, wherein the geometry of the rail is complementary to the geometry of the glide such that the geometry of the rail fits together with the geometry of the glide to provide for vertical and horizontal stability and alignment of the base and the cabinet.

In one embodiment, the geometry of the rail is a solid geometric configuration and the geometry of the glide is an open geometric configuration such that the solid configuration of the rail is accepted in the open geometric configuration of the glide. The solid geometric configuration of the rail and the open geometric configuration of the glide are provided such that the solid geometric configuration of the rail and the open geometric configuration of the glide are sufficiently complementary so that the relative vertical and horizontal movement of the rail to the glide is limited, thereby providing for vertical and horizontal stability and alignment of the base and the cabinet.

Exemplary solid geometries of the rail include L-shape, "ball and post" shape, square shape, rectangle shape, triangle shape, "X" shape, "T" shape, among others that will become apparent to those of skill in the art upon reading the following detailed description. Exemplary open geometries of the glide include complementary geometries to those of the solid geometry of the rail described above.

Alternatively, the geometry of the rail may be open and the geometry of the glide may be solid, in geometries as described above or as will become apparent to those of skill in the art upon reading the present disclosure. In this latter case as well, the geometries of the rail and glide are preferably sufficiently complementary so that the relative vertical and horizontal movement of the rail to the glide is limited, thereby providing for vertical and horizontal stability and alignment of the base and the cabinet.

Preferably, the rail and the glide are provided with a "stop", such that the linear movement of the rail relative to the glide, and/or vice versa, is limited such that the linear movement of the cabinet relative to the base is limited, thus ensuring that the linear alignment of the cabinet and the base is also correct and preventing linear misalignment of one to the other.

Also preferably, the cabinet and/or base are provided with a locking mechanism such that, once in place, the cabinet and base are prevented from substantially moving relative to each other in a linear direction. This ensures proper alignment of the cabinet and base and also prevents accidental misalignment of the cabinet and base during use or when the ice maker may be moved, such as for cleaning around and or under the ice maker, or for purposes of shifting its location, if so desired, within the environment in which it is being used.

The above-described and other features and advantages of the present disclosure will be appreciated and understood by those skilled in the art from the following detailed description, drawings, and appended claims.

DETAILED DESCRIPTION OF THE PREFERRED EMBODIMENTS

Figure 1:
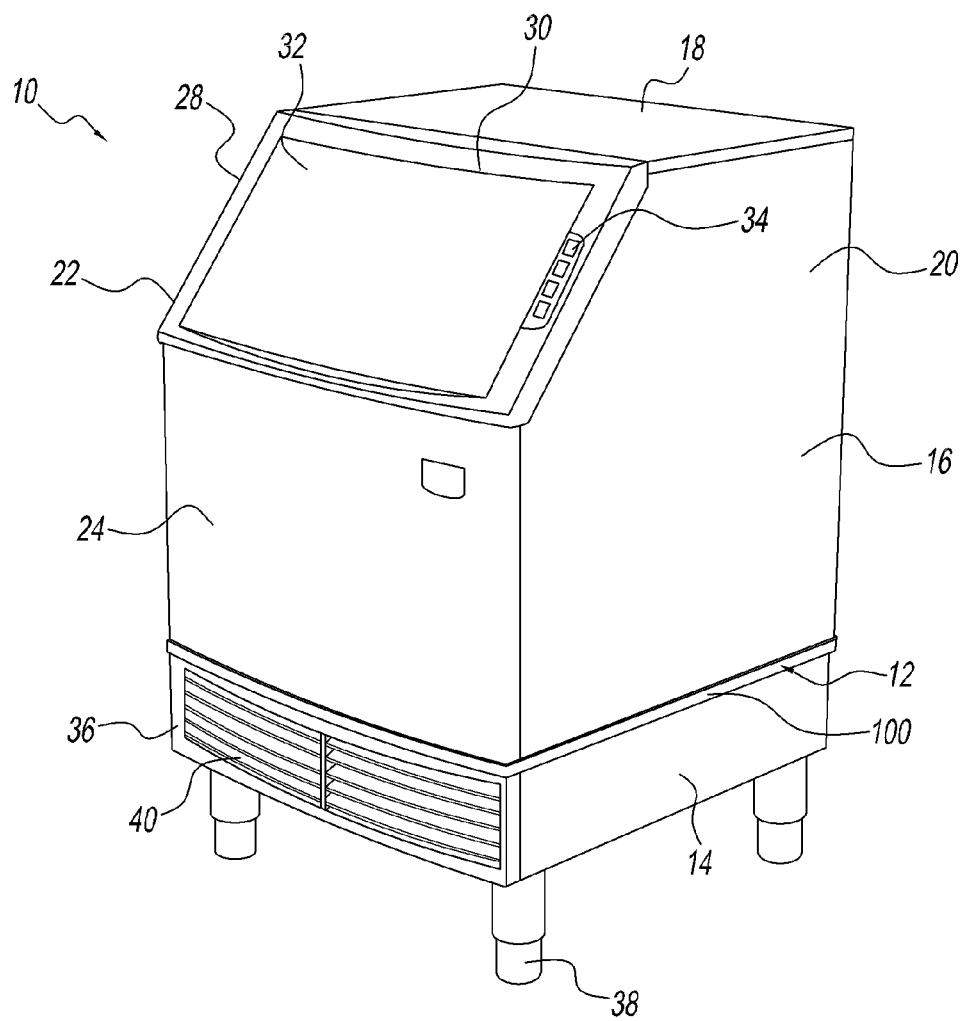
FIG. 1 is a front perspective view of an ice maker having an embodiment of a connection assembly for assembling a base and a cabinet assembly of the ice maker with the base connected to the cabinet assembly in a closed position.
Figure 2:
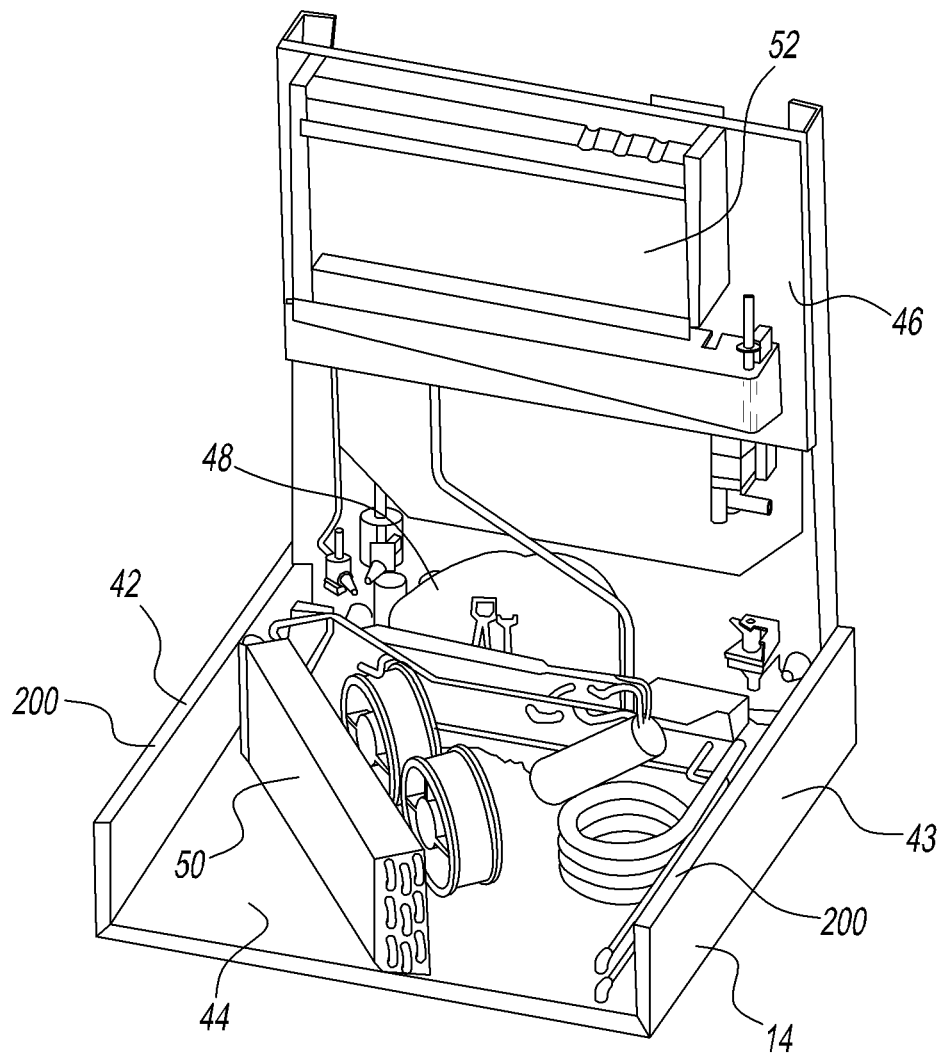
FIG. 2 is a front perspective view of the base connected to a support structure of FIG. 1.

Referring to the drawings and in particular to FIG. 1, an ice maker 10 that makes ice and has an exemplary embodiment of a connection assembly according to the present disclosure is shown in use and is generally referred to by reference numeral 12. Connection assembly 12 connects a base 14 to a cabinet assembly 16 in a closed position. Connection assembly 12 has two glides 100 connected to opposite sides of cabinet assembly 16 and two rails 200 (as shown in FIG. 2) formed on opposite sides of base 14. Base 14 and cabinet assembly 16 house an ice bin, a refrigeration system, and a water distribution system of ice maker 10. The water distribution system distributes water onto an ice forming surface that is connected to the refrigeration system forming ice that is harvested into the ice bin. The refrigeration system performs a vapor compression cycle as is known in the art for cooling during an ice forming cycle and heating during an ice harvesting cycle.

Referring again to FIG. 1, cabinet assembly 16 has a top wall 18, a first side wall 20 that is a mirror image of a second side wall 22, a front wall 24 and a door wall 28. Top wall 18, first side wall 20, second side wall 22 and front wall 24 each are metal having foam insulation on an interior side. Door wall 28 has a door opening 30 covered by a door 32. Door 32 is connected to door wall 28 so that door 32 can pivot from a closed position shown in FIG. 1 to an open position uncovering door opening 30 providing access to an interior of ice maker 10. Door wall 28 is connected to a user interface 34 allowing a user to communicate input to a controller (not shown) of ice maker 10.

Base 14 is connected to a front grill 36 and legs 38 that support base 14. Front grill 36 has openings 40 so that the interior of ice maker 10 can communicate with the ambient environment.

Referring to FIG. 2, base 14 has side walls 42, 43 connected to a bottom wall 44. Side walls 42, 43 are connected to an evaporator support structure 46. Each of side walls 42, 43 forms rail 200 on a top portion of side walls 42, 43. Base 14 supports a compressor 48 and a condenser 50 of the refrigeration system of ice maker 10. Evaporator support structure 46 supports an evaporator 52 of the refrigeration system of ice maker 10 that connects to the ice forming surface (not shown).

Figure 3:
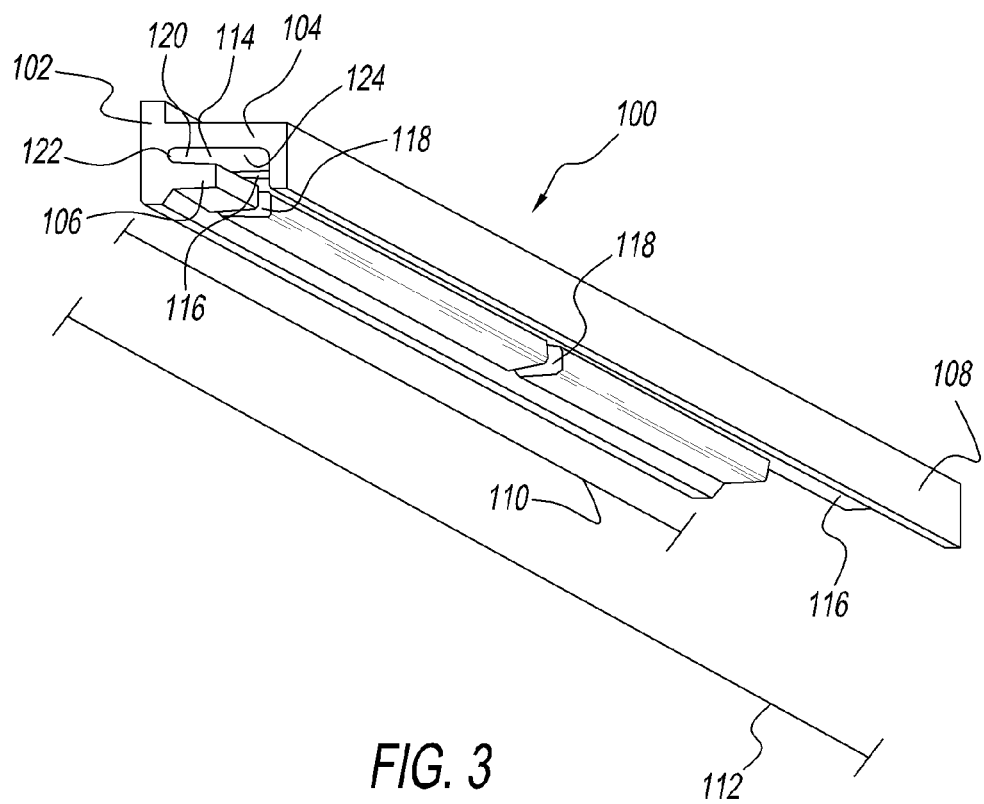
FIG. 3 is a front perspective view of a glide of FIG. 1.

Referring to FIG. 3, glide 100 has an inner vertical member 102 connected to an upper horizontal member 104 and a lower horizontal member 106. Upper horizontal member 104 is connected to an outer vertical member 108. Lower horizontal member 106 and inner vertical member 102 have a length 110 that is shorter than a length 112 of upper horizontal member 104 and outer vertical member 108. Upper horizontal member 104 has aperture(s) 116 so that a fastener may pass through upper horizontal member 104 and a portion of one of side walls 20, 22 to connect glide 100 to cabinet assembly 16. Lower horizontal member 106 has gaps 118. Gaps 118 allow access to rail 200 through lower horizontal member 106 when base 14 is connected to cabinet assembly 16. Inner vertical member 102, upper horizontal member 104, lower horizontal member 106 and outer vertical member 108 form a cavity (or "open geometry") 120 having an inverted L-shape. Cavity 120 has a horizontal portion 122 and a vertical portion 124.

Glides 100 may be plastic, metal, for example, aluminum, and/or metal with a polymer coating. It has been found by the inventors of the present disclosure that glides 100 that are plastic and side walls 42, 43 that are metal reduce friction as compared to glides 100 that are metal and side walls 42, 43 that are metal. It has also been found by the inventors of the present disclosure that glides 100 that are plastic and side walls 42, 43 that are metal do not require lubrication at an interface therebetween to achieve desirable relative slidable movement.

Figure 4:
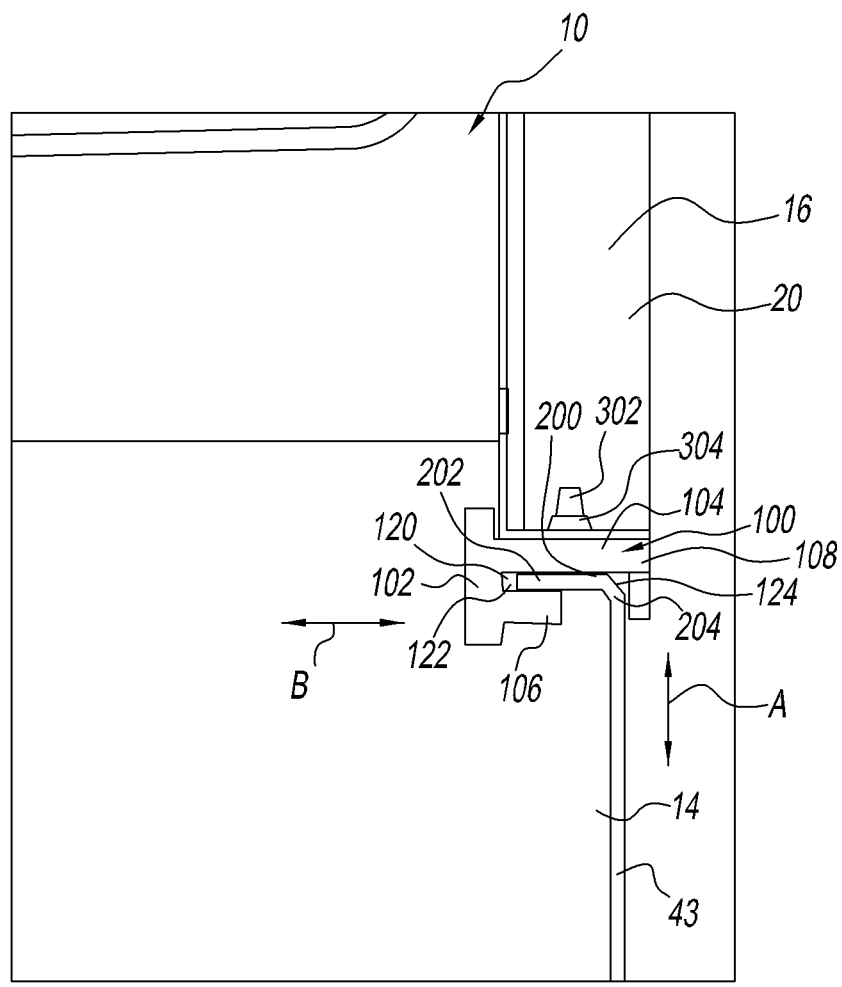
FIG. 4 is a partial front cross-sectional view of the base connected to the cabinet assembly of FIG. 1 with insulation of the cabinet assembly removed.

Referring to FIG. 4, side wall 20 of cabinet assembly 16 may be connected to glide 100 by a screw 302 that passes through side wall 20 and aperture 116 of upper horizontal member 104, and an extruded hole 304 that captures screw 302 to secure the connection between glide 100 and cabinet assembly 16. Glide 100 may have a depression or countersink so that a head on screw 302, that is on an opposite end as an end of screw 302 extending through sidewall 20, does not extend beyond glide 100.

Rail 200 is formed in an inverted L-shape complementary to cavity 120 of glide 100. Rail 200 has a horizontal portion 202 and a vertical portion 204. Rail 200 fits in cavity 120 of glide 100 to connect cabinet assembly 16 and base 14. Horizontal portion 202 of rail 200 fits in horizontal portion 122 of cavity 120 in glide 100 and vertical portion 204 of rail 200 fits in vertical portion 124 of cavity 120 in glide 100. Upper horizontal wall 104 and lower horizontal wall 106 are positioned above and below horizontal portion 202 of rail 200 to maintain alignment in the vertical direction, as shown by arrow A, of cabinet assembly 16 on base 14. Inner vertical portion 102 and outer vertical portion 108 are positioned on opposite sides of vertical portion 204 and horizontal portion 202 of rail 200 to maintain alignment in the horizontal direction, as shown by arrow B, of cabinet assembly 16 on base 14.

Second side wall 22 of cabinet assembly 16 is connected to another glide 100 in the same configuration as first side wall 20 is connected to glide 100 and the other glide 100 connected to second side wall 22 is a mirror image of glide 100 connected to first side wall 20. Rail 200 of side wall 42 of base 14 is a mirror image of rail 200 of side wall 43. The connection of rail 200 of side wall 42 and the other glide 100 connected to second side wall 22 is a mirror image of the connection of rail 200 of side wall 42 and glide 100 of first side wall 20.

Figure 5:
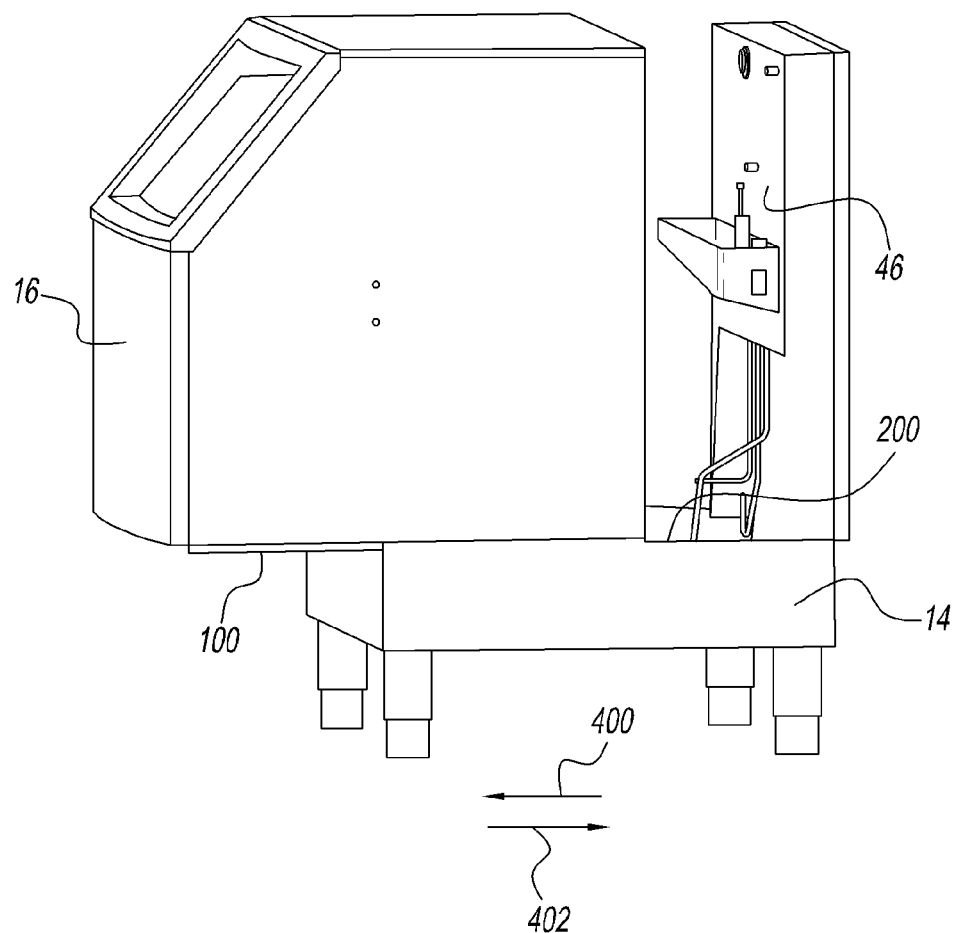
FIG. 5 is a side perspective view of the ice maker of FIG. 1 with a front grill removed and the base connected to the cabinet assembly so that the cabinet assembly is movable relative to the base.

Referring to FIG. 5, cabinet assembly 16 can move in a forward direction as shown by arrow 400 and rearward direction as shown by arrow 402 on base 14 when each of rails 200 are in one of glides 100 so that each of glides 100 slides along each of rails 200, respectively.

Figure 6:
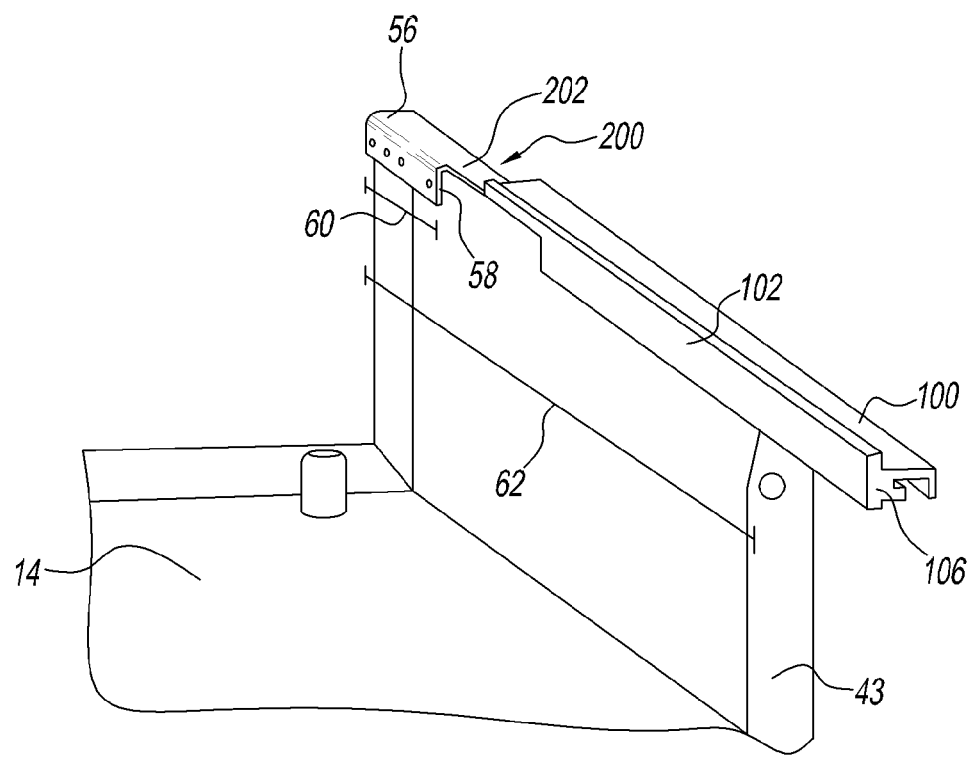
FIG. 6 is a partial front perspective view of the glide of FIG. 4 connected to the base of FIG. 1 so that the glide is movable on the base.

Referring to FIG. 6, each of side walls 42, 43 of base 14 has a stop 56. Stop 56 extends from each of side walls 42, 43 so that inner vertical member 102 and lower horizontal member 106 abut against stop 56 so that movement in the rearward direction, as shown by arrow 402 in FIG. 5, is prevented. Referring again to FIG. 6, stop 56 is includes a stop member 58 that extends vertically downward from horizontal portion 202 of rail 200. Stop member 58 is on a rear portion of side wall 43 and extends a length 60 that is less than a length 62 of side wall 43. Stop 56 on side wall 42 is a mirror image of stop 56 on side wall 43.

Figure 7:
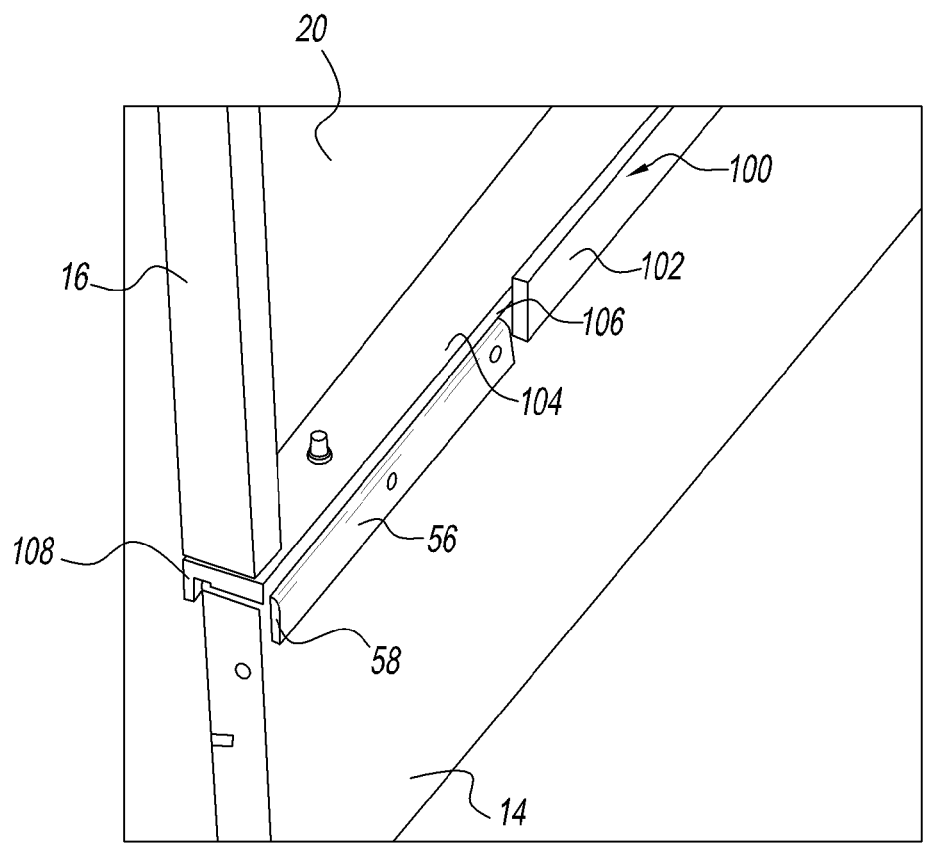
FIG. 7 is a partial front perspective view of the cabinet assembly connected to the base of FIG. 1 with the base connected to the cabinet assembly in the closed position and insulation of the cabinet assembly removed.

Referring to FIG. 7, cabinet assembly 16 can slide on base 14 in the rearward direction as shown by arrow 402 in FIG. 5 until lower horizontal member 106 and inner vertical member 102 abut stop 56. Upper horizontal member 104 and outer vertical member 108 extend the entire length 62 of side wall 43 when lower horizontal member 106 and inner vertical member 102 abut stop 56. Lower horizontal member 106 and inner vertical member 102 have length 110 (see, FIG. 3) and stop 58 has length 60 so that cabinet assembly 16 is laterally aligned in the closed position on base 14 when lower horizontal member 106 and inner vertical member 102 abut stop 56, as shown in FIG. 1.

Figure 8:
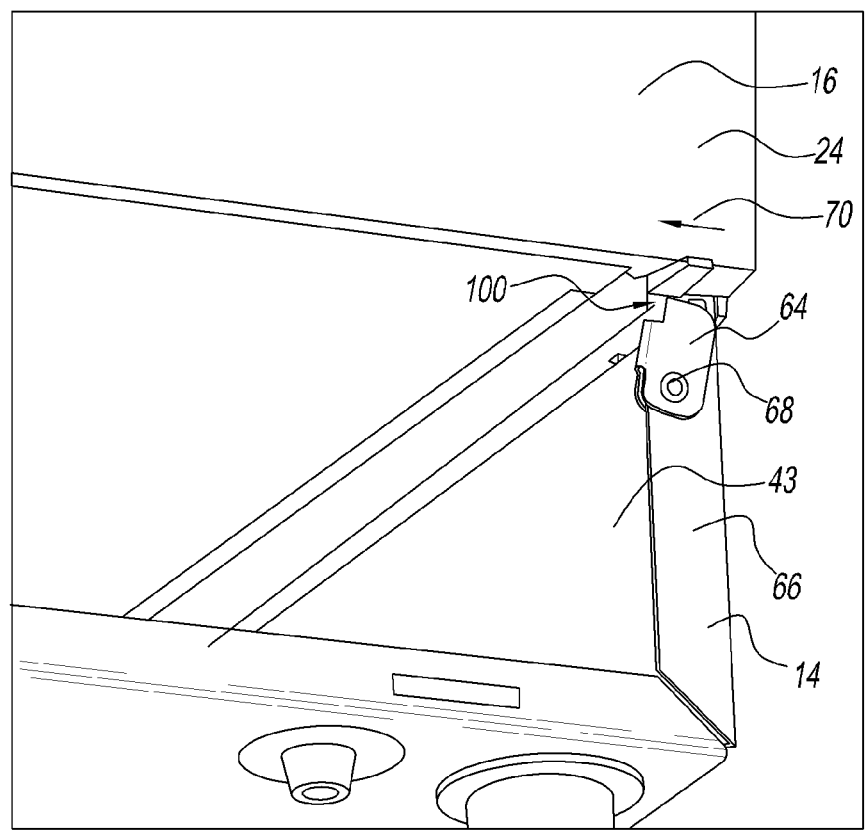
FIG. 8 is a partial front perspective view of the ice maker of FIG. 1 with the front grill removed and the base being connected to the cabinet assembly in the closed position with a locking mechanism in place.

Referring to FIG. 8, cabinet assembly 16 is maintained, or locked, in the closed position on base 14 by a flange 64. Flange 64 is connected to a front wall 66 that is connected to side wall 43 of base 14 by a fastener 68. Flange 64 is rotatable around fastener 68 so that flange 64 covers glide 100 in a secured position, as shown in FIG. 8, and rotates from the secured position in a direction 70 to an open position to uncover glide 100 allowing cabinet assembly 16 to move on base 14. Another flange may be connected to a front wall connected to side wall 42 of base 14 by a fastener in a configuration that is a mirror image to flange 68. This means of restraint could be executed via a washer and fastener, or other similar structures.

Fully insulated and assembled cabinet assembly 16 can be removed from base 14 and evaporator support structure 46 by rotating fasteners 68 to uncover glides 100 and sliding cabinet assembly 16 forward on glides 100. Glides 100 provide less friction than a design which has metal-on-metal contact for sliding cabinet assembly 16 off base 14. Alignment features on glide 100 engage rails 200 on base 14 ensuring alignment between cabinet assembly 16 and sidewalls 42, 43 of base 14. Additional features on glides 100 act as a positive stop when sliding cabinet assembly 16 onto base 14 which ensures proper alignment between cabinet assembly 16 and evaporator support structure 46. With the cabinet assembly 16 removed, all serviceable components are easily accessible whether the product is in a free-standing installation or built into an enclosure.

The modular construction of connection assembly 100 creates the ability to easily utilize semi knock down or component knock down manufacturing methods to maximize local content at the point of sale. Component knock down/semi knock down are terms used to describe the ability to transport a component/unit in a partially assembled manner, minimizing the footprint (removing empty spaces) to reduce shipping costs based on square footage or to allow for components to be nested together in an effort to reduce the footprint. This facilitates entry to markets with trade barriers related to local content by tailoring the assembly content to meet the market needs. This is accomplished by this design via the modular nature of the evaporator support structure 46, base 14 and cabinet assembly 16, which minimizes the amount of disassembly and re-assembly required to reach and or install key components.

Figure 9A:
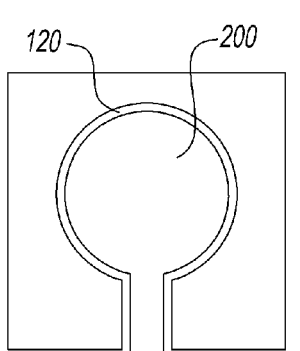
FIG. 9 shows alternative embodiments of the rail and glide opening according to the present disclosure.
Figure 9B:
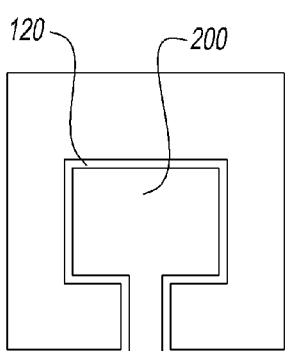
Figure 9C:
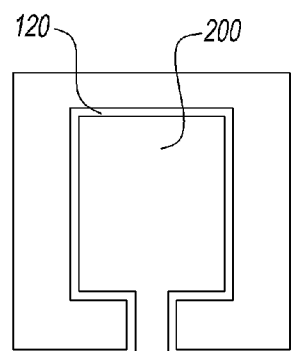
Figure 9D:
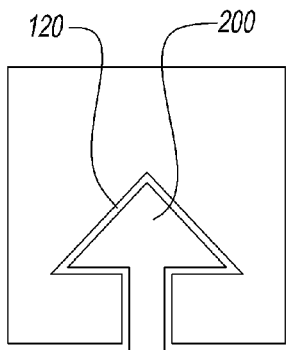
Figure 9E:
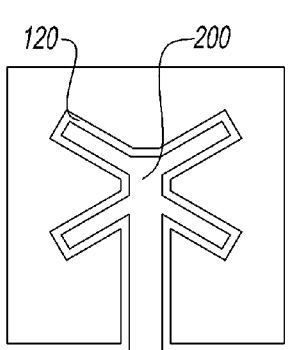
Figure 9F:
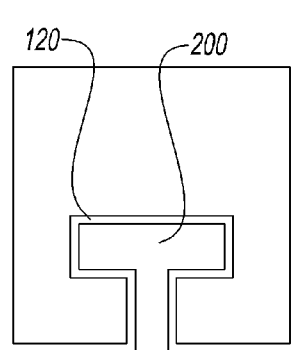

Referring to FIG. 9, various alternative solid geometries of rail 200 are shown as a "ball and post" shape, FIG. 9A, square shape, FIG. 9B, rectangle shape, FIG. 9C, triangle shape, FIG. 9D, "X" shape, FIG. 9E, and "T" shape, FIG. 9F. These shapes among others that will become apparent to those of skill in the art may be used as rails 200. Exemplary open geometries of glide opening 120 include complementary geometries to those of the solid geometry of rail 200 shown in FIGS. 9A-9F. As can be seen in FIGS. 9A-9F, all of the rail 200 and glide opening 120 provide horizontal (i.e., side to side or lateral) and vertical stability between rail 200 and glide opening 120, thereby limiting relative movement between rail 200 and glide opening 120 and thus relative movement between base 13 and cabinet assembly 16.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the present disclosure.

What is claimed is:

1. A connection assembly for an ice maker having a base and a cabinet, said assembly comprising:
    at least one guide rail disposed along a length of a top portion of said base; and
    at least one glide disposed along a length of a bottom portion of said cabinet, said glide having an open geometry configured to receive said guide rail therein, wherein said guide rail is configured to restrict said glide from moving in the vertical and horizontal directions when said glide is securely disposed about said guide rail, wherein said glide comprises (1) at least a pair of oppositely disposed side walls which preclude said glide from moving in the horizontal direction when disposed about said guide rail, wherein said at least a pair of oppositely disposed side walls comprise an inner side wall and an outer side wall each having a length, and wherein the length of said inner side wall is shorter than the length of said outer side wall, (2) at least a top surface and (3) at least a bottom surface having an open space therebetween which precludes said glide from moving in a vertical direction when disposed about said guide rail, wherein said bottom surface of said glide has an opening to allow said glide to reciprocally move about said guide rail in a direction along said guide rail, wherein said at least a top surface and said at least a bottom surface each has a length, wherein the length of said at least a bottom surface is shorter that the length of said at least top surface, and wherein the shorter lengths of said inner side wall and said bottom surface are configured to cooperate with a stop to provide for lateral alignment of said base and said cabinet.

2. A connection assembly for an ice maker according to claim 1, wherein the shape of said at least one guide rail is complementary to said at least one glide.

3. The connection assembly according to claim 2, further comprising a stop that limits the reciprocal movement between the guide rail and glide.

4. The connection assembly according to claim 2, further comprising a locking mechanism that substantially prevents the cabinet and base from the reciprocal movement.

5. The connection assembly according to claim 1, further comprising a stop that limits the reciprocal movement between said guide rail and said glide.

6. The connection assembly according to claim 1, further comprising a locking mechanism that substantially prevents the cabinet and base from the reciprocal movement.

7. The connection assembly according to claim 1, wherein said glide and said guide rail are made of a material selected from the group consisting of plastic, metal, metal with polymer coating and any combinations thereof.

8. A connection assembly for an ice maker having a base and cabinet assembly, said assembly comprising:
- at least one guide rail disposed along a length of a top portion of said base, said guide rail comprised of a shape selected from the group consisting of L-shape, "ball and post" shape, square shape, rectangle shape, triangle shape, "X" shape, "T" shape and any combinations thereof; and
- at least one glide disposed along a length of a bottom portion of said cabinet, said glide having an open geometry configured to receive said guide rail therein, wherein said guide rail is configured to restrict said glide from moving in the vertical and horizontal directions when said glide is securely disposed about said guide rail, wherein said glide comprises (1) at least a pair of oppositely disposed side walls which preclude said glide from moving in the horizontal direction when disposed about said guide rail, wherein said at least a pair of oppositely disposed side walls comprise an inner side wall and an outer side wall each having a length, and wherein the length of said inner side wall is shorter than the length of said outer side wall, (2) at least a top surface and (3) at least a bottom surface having an open space therebetween which precludes said glide from moving in a vertical direction when disposed about said guide rail, wherein said bottom surface of said glide has an opening to allow said glide to reciprocally move about said guide rail in a direction along said guide rail, said opening comprised of a shape selected from the group consisting of L-shape, "ball and post" shape, square shape, rectangle shape, triangle shape, "X" shape, "T" shape and any combinations thereof, wherein said at least a top surface and said at least a bottom surface each has a length, wherein the length of said at least a bottom surface is shorter that the length of said at least top surface, and wherein the shorter lengths of said inner side wall and said bottom surface are configured to cooperate with a stop to provide for lateral alignment of said base and said cabinet.

9. The connection assembly according to claim 8, wherein said glide and said guide rail are made of a material selected from the group consisting of plastic, metal, metal with polymer coating and any combinations thereof.

* * * * *